United States Patent [19]

Witwer

[11] Patent Number: 5,044,068
[45] Date of Patent: Sep. 3, 1991

[54] BLADE PACK EXTENSION AND WEDGE GUIDE SUPPORT

[75] Inventor: Keith A. Witwer, Fort Wayne, Ind.

[73] Assignee: Advanced Machine and Tool Corporation, Fort Wayne, Ind.

[21] Appl. No.: 607,907

[22] Filed: Nov. 1, 1990

[51] Int. Cl.$^5$ .............................................. B23P 19/00
[52] U.S. Cl. ........................................ 29/734; 29/596
[58] Field of Search ................. 29/596, 606, 732, 734, 29/736

[56] References Cited

U.S. PATENT DOCUMENTS 3,829,953 8/1974 Lauer et al. ............................ 29/734
4,276,689 7/1981 Urick et al. ............................ 29/734

Primary Examiner—P. W. Echols
Attorney, Agent, or Firm—Jeffers, Hoffman & Niewyk

[57] ABSTRACT

An apparatus for inserting coils and wedges into the stator core of an electric motor. The apparatus includes a plurality of elongated blades arranged in a circular array, a plurality of wedge guides arranged in a circular array, and a stripper. Additionally, a wedge guide support is provided which moves axially together with the blades and which supports the wedge guides when coils are inserted into a long stator core. The wedge guide support prevents deflection of the wedge guides radially inward by pressure of the coil end turns on the wedge guides when the blade pack is axially moved out of the wedge guides.

18 Claims, 4 Drawing Sheets

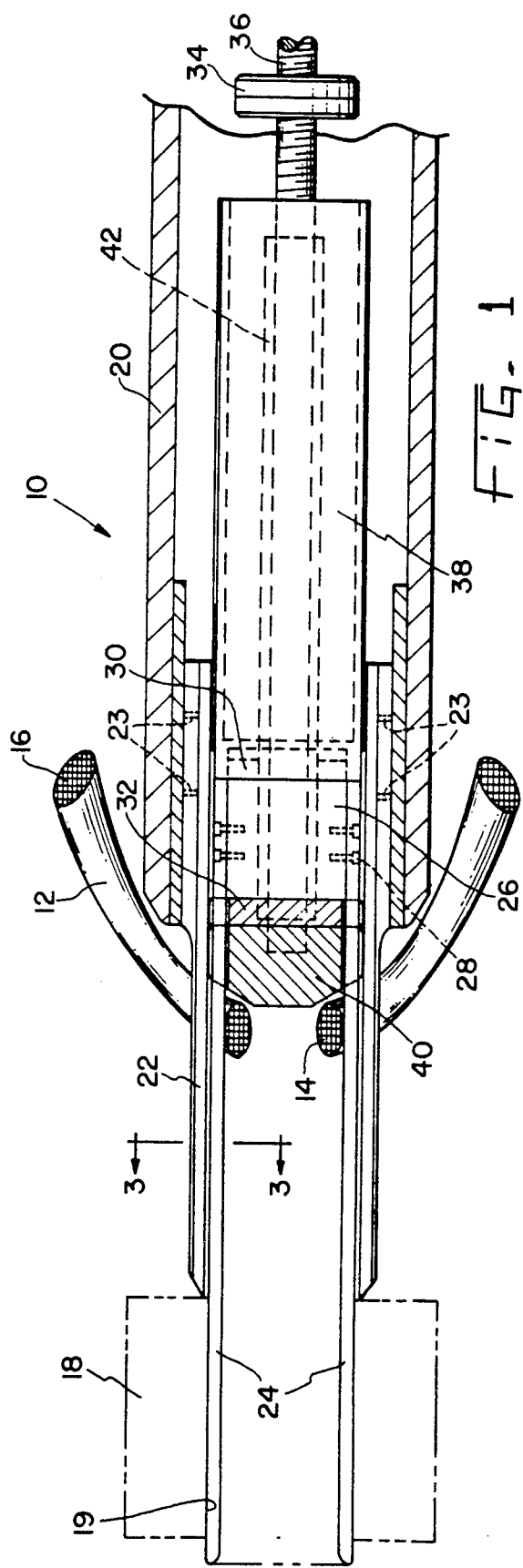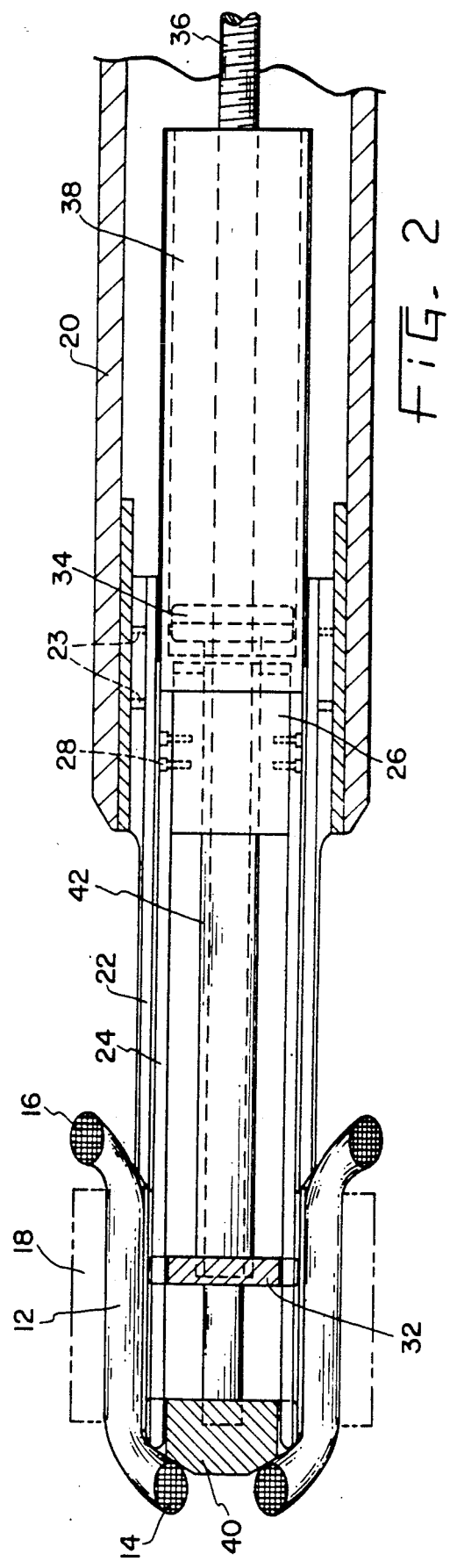

BLADE PACK EXTENSION AND WEDGE GUIDE SUPPORT

BACKGROUND OF THE INVENTION

This invention relates to an apparatus for inserting coils and wedges into stator cores of dynamoelectric machines. In particular, this application relates to an apparatus for insertion of coils and wedges into lengthy stator cores, namely stator cores which have a relatively large stack height to bore diameter ratio.

A number of machines have been developed for inserting pre-wound coils and wedges into stator cores. In such machines the coils are generally formed on winding machines and are placed over an array of tooling blades or fingers for subsequent insertion into a stator core. Insulating wedges may be inserted by the same equipment to separate windings from one another or to insulate the windings from the stator core.

In such machines, the wedge guides for guiding the wedges into the stator slots are arranged in a circular array and are supported by a housing. A moveable blade pack including a stripper and an array of blades is disposed inside of the wedge guide array. After the coils have been draped over the blades, a blade and core alignment device is loaded onto the array of blades. The core is then loaded onto the alignment device and onto the array of blades until the core come into contact with the array of wedge guides. The core is secured in place with clamp arms and the blades are inserted into the bore of a stator core for insertion of the pre-wound coils into the stator core slots by means of relative axial movement of the stripper with respect to the blade array. During the insertion of the coils into the stator core, the wedges are also inserted into the slots of the stator core. During such wedge insertion, the wedges are guided by the wedge guides and supported by the stripper.

In the insertion of pre-wound coils into lengthy cores, the blades will need to travel a substantial axial distance and therefore may move completely out of the wedge guide array. Since the wedge guides are generally made of fairly thin metal, when the coil wire end turns are pulled tight during insertion, the wedge guides will be deflected radially and axially inward toward the center of the circular wedge guide array once the blades have left the wedge guide array and therefore no longer support the wedge guides. Accordingly the wedge track formed by and located between the individual wedge guides through which the wedges are pushed into the slots of the stator core will no longer align accurately with the stator when the wedge guides are thus deflected. The stator core iron may therefore dig into the wedge and may even stop the wedge from further movement. Accordingly less than complete insertion of the wedges may be encountered during such wedge insertion operations. If the deflection of the wedge guides is great enough, it is even possible that the entire coil insertion process may be stopped because of jamming of the apparatus.

An additional problem that occurs in such insertion operations is that the blade pack, consisting of the blades, the stripper and the blade holder, upon its retraction back into the wedge guide array, would interfere mechanically with the deflected wedge guides, therefore potentially causing severe wear of both the wedge guides and the blades. After a sufficient number of insertion cycles, the wear of both the wedge guides and the blades may be so extensive that they need to be replaced. Such replacement is relatively expensive because of the cost of providing accurately machined wedge guides as well as insertion blades.

Thus it is desired to provide an apparatus wherein the wedge guides are supported against radial inward deflection by the coils throughout the insertion process both in cases of standard length stator cores and very long stator cores. Such support would avoid or reduce the problems enumerated above.

SUMMARY OF THE INVENTION

The present invention overcomes the disadvantages of the above described prior art insertion apparatuses by providing an improved insertion apparatus therefor.

The apparatus, according to the present invention, for inserting coils and wedges into a stator core includes a wedge guide support which is connected to the blade pack. The wedge guide support supports the wedge guides from radial inward movement after the blades have left the wedge guide array.

The present invention, in one form thereof, comprises a coil insertion apparatus including a set of elongated blades and a blade holder for attachment of the blades thereto. Also attached to the blade holder is a tubular or cylindrical wedge guide support which continues to support the wedge guides from radial inward movement upon extension of the blades out of the wedge guides and which therefore insures that the wedge tracks will always align properly with the slots of the stator core.

An additional advantage of the present invention is that it avoids the deflection or bending of the wedge guides and the resultant undue wear of both the wedge guides and the blades upon retraction of the blade pack into the wedge guide array.

Still a further advantage of the present invention, is that it insures complete insertion of the wedges and furthermore avoids stalling of the insertion process occasioned by the prior art coil insertion apparatuses.

A yet still further advantage of the present invention is that it permits the use of shorter blades than previous apparatuses. Such shorter blades are easier to manufacture and are less expensive than prior art longer blades.

Yet another advantage of the present invention is that by the use of a cylindrical or tubular wedge guide support, better dimensional integrity of the tool pack can be established since the cylindrical or tubular wedge support member is easier to manufacture than the long blades required by prior art apparatuses.

Yet still another advantage of the present invention is that it permits insertion of pre-wound coils into longer stator cores then was previously possible.

The present invention, in one form thereof, comprises an apparatus for inserting coils and wedges into a dynamoelectric machine stator core. The apparatus includes a generally tubular housing having an axis. A plurality of spaced, elongated wedge guides, arranged in a circumferential array, are mounted on the housing. A plurality of elongated blades are disposed within the wedge guide array for axial movement relative to the wedge guides. A stripper is movably mounted within the plurality of blades for axial movement relative to the blades. A wedge guide support means is operatively associated with the wedge guides for axial movement relative to the wedge guides and for laterally supporting the wedge guides when the blades have axially moved out of the wedge guide array.

The present invention, in one form thereof, comprises an apparatus for inserting coils and wedges into a dynamoelectric machine stator core. The apparatus includes a generally cylindrical housing having an axis. A plurality of elongated wedge guides, spaced from one another, forms a circumferential array around the axis of the housing. A plurality of elongated blades are axially movably disposed within the housing and are adapted to move a predetermined distance relative to the wedge guides. A stripper is movably mounted within the plurality of blades for axial movement relative to the blades. A cylindrical wedge guide support is disposed within the housing and is adapted to axially move relative to the wedge guides. The wedge guide support is adapted to laterally support the wedge guides when the blades have axially moved through the predetermined distance.

The present invention, in one form thereof, comprises an apparatus for inserting coils and wedges into a dynamoelectric machine stator core. The apparatus includes a housing having an axis. A plurality of spaced apart, elongated wedge guides are disposed in a circumferential array within the housing. A plurality of elongated blades are circumferentially mounted within the wedge guide array and are adapted to move through a predetermined axial distance relative to the wedge guides, the length of the blades being less than the predetermined distance. A blade holder is secured to the plurality of blades and a stripper is movably mounted within the circumferentially mounted plurality of blades for axial movement relative to the blades. A cylindrical wedge guide support is disposed within the housing for axial movement relative to the wedge guides. The support is adapted to laterally support the wedge guides when the blades have axially moved through the predetermined distance and outside of the wedge guide array.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is an elevational cross-sectional view of a coil and wedge insertion apparatus with the blades extending through the bore of a stator core and the coils in position to be inserted;

FIG. 2 is a cross-sectional elevational view of the apparatus of FIG. 1 with the coils inserted into the stator core;

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Figure 4:
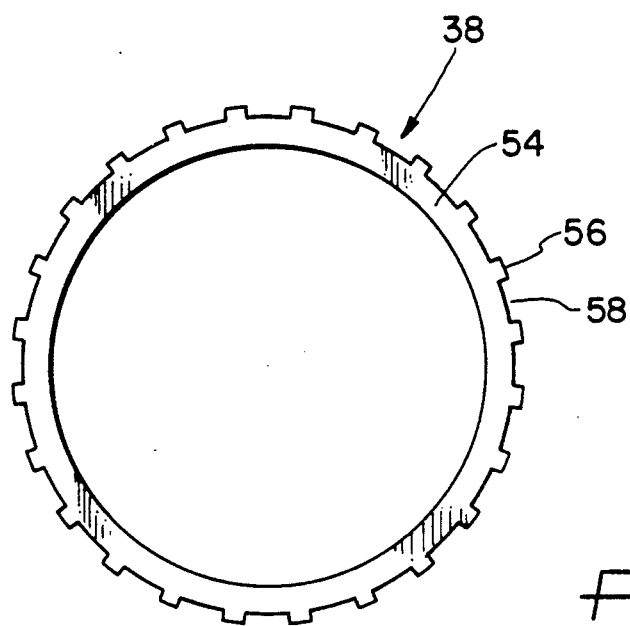
FIG. 4 is a cross-sectional view of the wedge guide support.

Referring now to FIG. 1, there is shown an apparatus 10 for insertion of both pre-wound coils 12 and wedges (not shown) into a stator core 18. Coils 12 include end turns 14 and 16. The stator core 18 is shown as including a bore 19. A wedge guide housing 20 is shown to which a plurality of elongated wedge guides 22 are secured by fasteners as shown at 23. The spaced apart wedge guides form a circumferential array for guiding insulative wedges into the slots of the stator core 18. In the disclosed embodiment the array is circular. The wedge guides 22 and housing 20 ar stationary and will retain their respective axial positions with respect to stator core 18 as shown in FIG. 1 throughout the insertion process.

A plurality of elongated blades 24 are disposed within the circular confines of the circular array of wedge guides 22. The blades 24 are secured to a blade holder 26 by means of fasteners 28. Blades 24 and blade holder 26 are axially moveable relative to wedge guides 22. A bushing 30 is provided to permit rotation of blades 24 and blade holder 26 relative to an adjustment plate (not shown) for adjusting the stopping position of the blade holder for the desired fully extended position of the blades to match the stack height of the stator into which the coils and wedges are to be inserted. This arrangement is conventional and permits the adjustment of the blades for varying stack heights of stator laminations. A plurality of adjusting rods (not shown) are secured to the bushing and permit the rotation of blades 24 and blade holder 26 for adjustment of the insertion apparatus for various lamination stack heights.

A wedge support 32 is shown for supporting the wedges (not shown in FIG. 1) at intermediate support points during the insertion process. The operation and structure of the wedge support is the subject of copending U.S. Pat. Application Ser. No. 607,913 entitled "Wedge Inserter with Intermediate Wedge Support" filed on even date herewith, which application is incorporated herein by reference. A wedge support tube 42 is also shown for supporting wedge support 32. Adjusting plate 34 drives the wedge support tube 42.

A stripper 40 is shown for stripping coils from blades 24 during insertion of the coils into the slots of core 18. Stripper 40 is axially moveable with respect to both the wedge guides 22 and insertion blades 24. Stripper 40 is driven by stripper rod 36 which in turn is connected to a driving mechanism (not shown).

Figure 3:
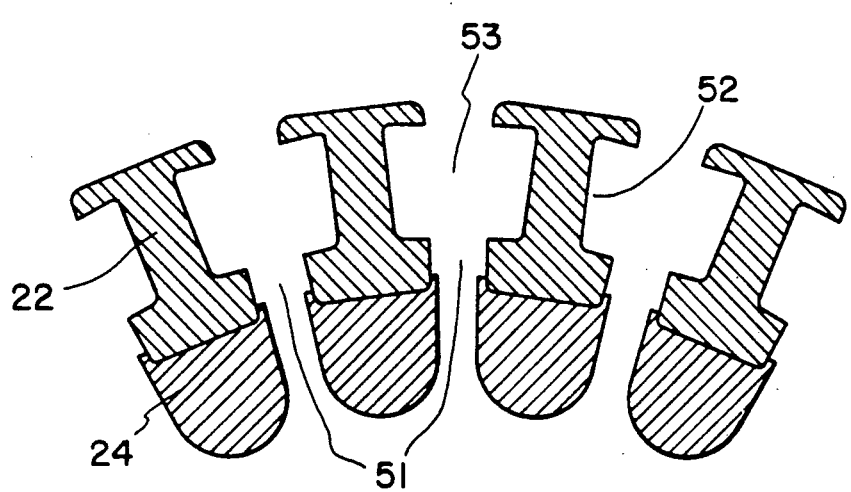
FIG. 3 is a partial, enlarged, cross-sectional view of the wedge guide and blade arrays taken along line 3—3 of FIG. 1.

Referring to FIGS. 1 and 3, it can be seen that blades 24 engage with wedge guides 22 and support the same from radial inward movement. Wedge guides 22 each include slots 52 which form wedge tracks 53 through which wedges (not shown) are guided into the slots of stator core 18. Spaces 51 separate wedge guides 22.

Further referring to FIG. 1, a wedge guide support 38 is shown secured to blade holder 26. Wedge guide support 38 is a cylindrical tubular member which is shown in cross-section in FIG. 4. On the cylindrical outside surface of wedge guide support 38 a number of fins 56 are provided which define wedge guide support slots 58. During engagement of wedge guide support 38 with wedge guides 22, fins 56 will slide in spaces 51 between the wedge guides and wedge guides 22 will slide in slots 58. Thus, the wedge guides are always supported against radial inward movement, either by blades 24 or by wedge guide support 38 during the insertion process.

Figure 5:
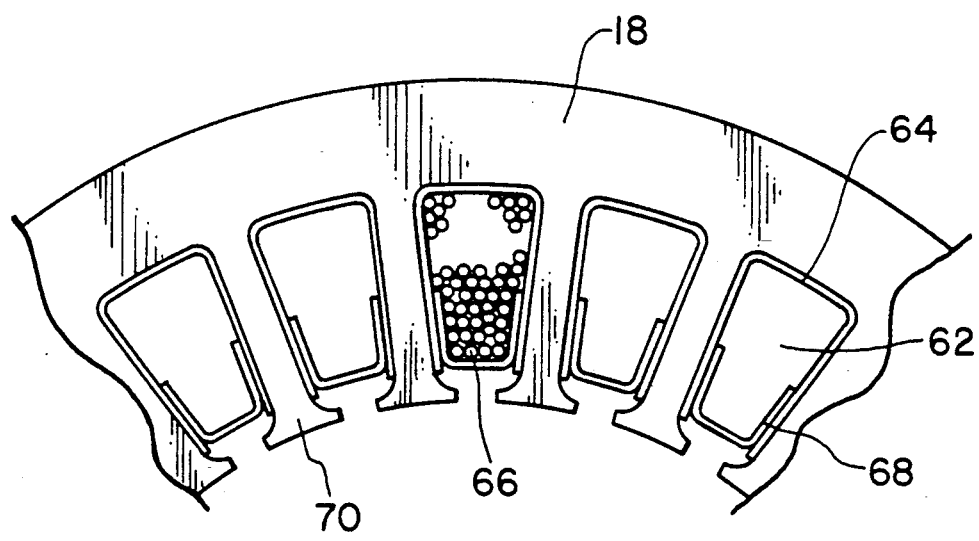
FIG. 5 is a partial, enlarged, cross-sectional view of a stator core with an inserted coil and inserted wedges.

Referring now to FIG. 5, a section of a stator 18 is shown in cross section. Stator slots 62 are shown to include slot liners 64 for electrically insulating the iron of the stator core 18 from coil wire 66 shown inserted in one of the slots. Also shown are wedges 68 for both insulating wire 66 from the iron of the core 18 and furthermore from preventing the wire from moving out of slots 62.

In operation, the apparatus functions as follows. Referring to FIG. 1, the apparatus 10 is first lined up with a stator core 18 so that blades 24 can be inserted through the bore 19 of stator core 18. In this position stator core 18 will rest on the ends of wedge guides 22, blades 24 are aligned with portions 70 of stator core 18 as shown in FIG. 5. Blades 24 are furthermore aligned with and support wedge guides 22 as shown in FIG. 3. In this position, blades 24 will therefore support wedge guides 22 and will prevent their radial inward deflection despite inward forces on wedge guides 22 by the coil wire. In the configuration FIG. 1, stripper 40 has not yet been activated, coils 12 have already been draped over both blades 24 and wedge guides 22 and extend into selected spaces 51 located between wedge guides 22 and blades 24. End turns 14 are located within the confines of the circular array of blades 24. End turns 16 extend outside the circular arrays of both blades 24 and wedge guides 22. Additionally, wedge guide support 38 is in its retracted position together with the blade holder 26 to which it is attached, wherein wedge guide support 38 is in contact only with the lower portions of wedge guides 22 as shown in FIG. 1.

Referring now to FIG. 2, it can be seen that stripper rod 36 has been actuated so that stripper 40 has moved through the bore 19 of stator core 18 and has inserted coils 12 into the slots of stator core 18. Note that in this embodiment wherein the core 18 is not very long, blade holder 26 is still so situated that blades 24 support wedge guides 22. Also note that wedge guide support 38 has not moved relative to wedge guides 22 for the insertion of coils 12 to be completed.

For conventional stator configurations, wherein the lamination stack is less than 6 inches long, the blade pack, comprising the stripper, the blade holder, and the blades, is generally 7 inches long. Thus for these standard length configurations of stator cores, no additional radial inward support for wedge guides 22 is necessary, because the blade pack will never leave the axial confines of the wedge guide array. However, if longer lamination stacks are used, support for wedge guides 22 becomes necessary.

Figure 6:
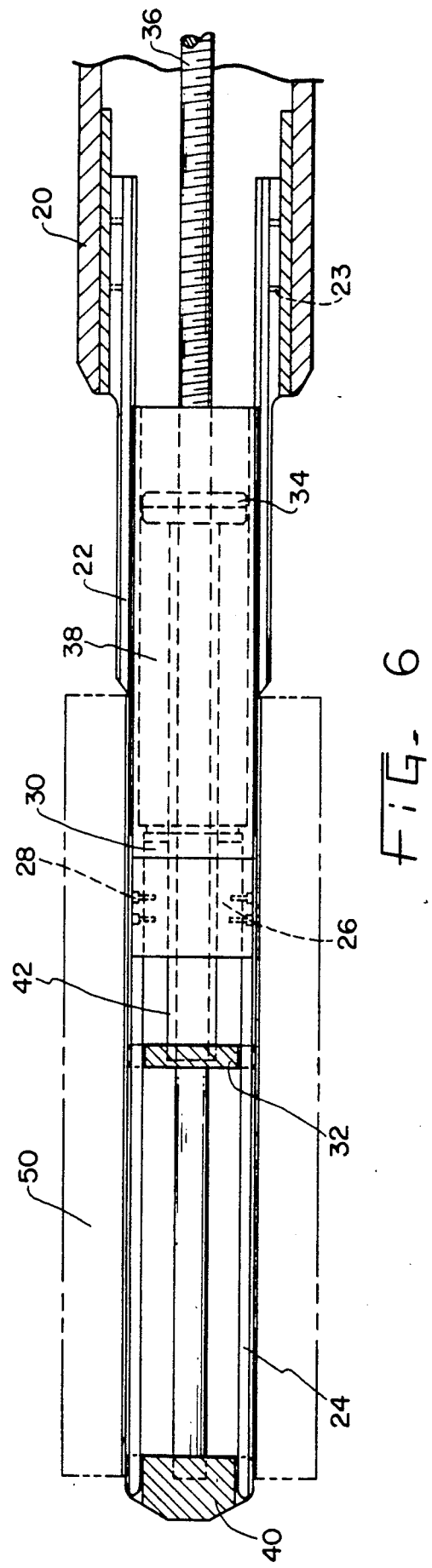
FIG. 6 is a cross-sectional elevational view of the apparatus of FIG. 1 with the blades and the wedge guide support fully extended for insertion of a pre-wound coil into a long stator core.

Referring to FIG. 6, it can be seen that a very long stator core 50 has been provided. Note that in this embodiment wherein stripper 40 has moved through the core (the coils are not shown for convenience), blades 24 have moved completely out of the array of wedge guides 22. Thus the entire blade pack including stripper 40, blades 24 and blade holder 26 have moved into core 50 so that the blades no longer support wedge guides 22. Note, however, that since wedge guide support 38 is secured to blade holder 26, the wedge guide support 38 now supports wedge guides 22. If wedge guide support 38 were not provided to support wedge guides 22, the force of wire coils 12 radially inward on wedge guides 22 during the insertion process would force the thin wedge guides 22 to be deflected inwardly and to be misaligned with the core 50, thus resulting in the problems discussed hereinabove. However, by means of providing wedge guide support 38, the entire insertion process can continue smoothly while providing continuous support for wedge guides 22 and eliminating misalignment and subsequent wear of the wedge guides and blades as well as ensuring full insertion of wedges 68 and eliminating stalling of the insertion process.

Applicant has found that, by using the apparatus according to the present invention, coils can be successfully inserted into stator cores as long as twenty four (24) inches.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for inserting coils and wedges into a dynamoelectric machine stator core, said apparatus comprising;
   a generally tubular housing, said housing having an axis;
   an array of circumferentially spaced, elongated wedge guides mounted on said housing;
   a plurality of elongated blades disposed within said wedge guide array for axial movement relative to said wedge guides;
   a blade holder means secured to said blades for supporting said blades;
   a stripper movably mounted within said plurality of blades for axial movement relative to said blades; and
   a wedge guide support means operatively associated with said wedge guides for laterally supporting said wedge guides when said blades have moved axially outside of said wedge guide array.

2. The apparatus according to claim 1 wherein said wedge guide support means comprises a cylinder.

3. The apparatus according to claim 1 and including a blade holder, said plurality of blades secured to said blade holder.

4. The apparatus according to claim 3 wherein said wedge guide support means is secured to said blade holder.

5. The apparatus according to claim 1 wherein an outside surface of said wedge guide support means includes fins located thereon, said wedge guides being separated by spaces therebetween, said fins adapted to move axially in said spaces when said wedge guide support means moves relative to said wedge guides.

6. The apparatus according to claim 1 including a blade holder, said plurality of blade secured to said blade holder, said wedge guide support means comprising a cylindrical tube secured to said blade holder for axial movement therewith.

7. The apparatus according to claim 1 wherein said blades are adapted to move a predetermined distance relative to said wedge guides and wherein said blades are shorter than said predetermined distance.

8. An apparatus for inserting coils and wedges into a dynamoelectric machine stator core, said apparatus comprising;

a generally cylindrical housing, said housing having an axis;

a plurality of elongated wedge guides spaced from one another and forming a circular array around said axis;

a plurality of elongated blades axially movably disposed within said housing and adapted for moving a predetermined distance relative to said wedge guides;

a blade holder means secured to said blades for supporting said blades;

a stripper movably mounted within said plurality of blades for axial movement relative to said blades; and a cylindrical wedge guide support disposed within said housing and adapted for axial movement relative to said wedge guides, said wedge guide support adapted to laterally support said wedge guide when said blades have moved axially through said predetermined distance.

9. The apparatus according to claim 8 and including a blade holder, said plurality of blade secured to said blade holder.

10. The apparatus according to claim 9 wherein said wedge guide support is secured to said blade holder.

11. The apparatus according to claim 8 wherein an outside surface of said wedge guide support includes fins located thereon, said wedge guides being separated by spaces located therebetween, said fins adapted to move axially in said spaces when said wedge guide support moves relatively to said wedge guides.

12. The apparatus according to claim 8 including a blade holder, said plurality of blades secured to said blade holder, said wedge guide support comprising a cylindrical tube secured to said blade holder for movement therewith.

13. The apparatus according to claim 8 wherein said blades are shorter than said predetermined distance.

14. An apparatus for inserting coils and wedges into a dynamoelectric machine stator core, said apparatus comprising;

a housing, said housing having an axis;

a plurality of spaced apart, elongated wedge guides disposed in a circumferential array within said housing;

a plurality of elongated blades circumferentially mounted within said array and adapted for movement through a predetermined axial distance relative to said wedge guides, the length of said blades being less than said predetermined axial distance;

a blade holder secured to said plurality of blades;

a stripper movably mounted within said plurality of blades for axial movement relative to said blades; and a cylindrical wedge guide support disposed within said housing for axial movement relative to said wedge guides, said support adapted to laterally support said wedge guides when said blades have moved axially through said predetermined distance and are located outside of said wedge guides.

15. The apparatus according to claim 14 wherein said wedge guide support is secured to said blade holder.

16. The apparatus according to claim 14 wherein an outside surface of said wedge guide support includes fins located thereon, said wedge guides being separated by spaced therebetween, said fins adapted to move axially in said spaces when said wedge guide support moves relative to said wedge guides.

17. The apparatus according to claim 14 wherein said wedge guide support is secured to said blade holder for axial movement therewith.

18. The apparatus according to claim 14 wherein said circumferential array is circular.

* * * * *